April 20, 1926.

A. O. APPELBERG

THERMOSTATIC TIME SWITCH

Filed Sept. 23, 1922

1,581,714

Inventor:
A. O. Appelberg

Patented Apr. 20, 1926.

1,581,714

UNITED STATES PATENT OFFICE.

AXEL OSVALD APPELBERG, OF STOCKHOLM, SWEDEN, ASSIGNOR TO AKTIEBOLAGET BIRKA REGULATOR, OF STOCKHOLM, SWEDEN.

THERMOSTATIC TIME SWITCH.

Application filed September 23, 1922. Serial No. 590,116.

*To all whom it may concern:*

Be it known that AXEL OSVALD APPELBERG, a subject of the King of Sweden, residing at 11 Roslagsgatan, Stockholm, Sweden, has invented certain new and useful Improvements in Thermostatic Time Switches, of which the following is a specification.

The invention relates to an improvement in thermostatic time switches, particularly such used in electric light installations for lighting a lamp or set of lamps during a pre-determined short period of time, and which are brought in operation in known manner by means of a push-button switch or the like, the latter, upon being operated, closing the circuit of the heating winding of the thermostat, which is then heated to close the lamp circuit. If such a device shall be capable of operating without additional relays and the like, it is, evidently, necessary that the amount of heat stored up in the thermostat and its winding in the relatively short period of time, during which the push-button is operated, should be sufficient to keep the contacts of the thermostat and the lamp circuit closed during the desired length of time. The main object of the present invention is to bring about an instantaneous storing of the amount of heat required and a slow emission of heat, or, to obtain a long closing period by a relatively small amount of energy supplied to the heating winding. This is attained according to the invention by the thermostatic switch being arranged in an evacuated receptacle, the vacuum forming an effective insulation of the thermostat against the surrounding air so as to retard the emission of heat. In addition thereto this arrangement affords the advantage that the opening of the lamp circuit takes place in vacuum and the detrimental effect of the break sparks on the breaking contacts is therefore reduced, which is particularly of importance in thermostatic switches where the interruption of the current takes place relatively slowly.

Figure 1:
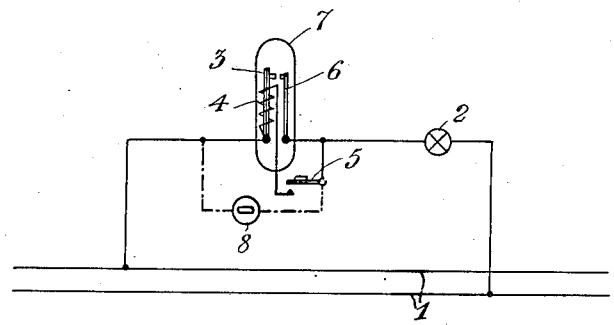
Figure 2:
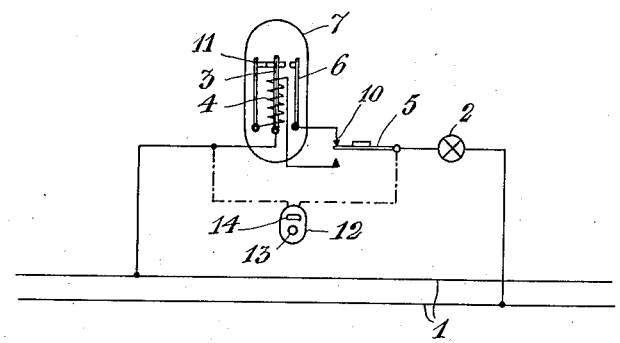
Figure 3:
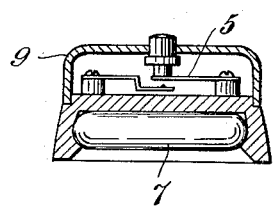

The accompanying drawing shows different embodiments of the invention. Figs. 1 and 2 show the thermostatic switch as used in light installations for lighting a lamp occasionally during a pre-determined short period of time. Fig. 3 is a cross section of the push-button switch having the push-button contacts as well as the thermostatic switch arranged within the same casing.

In the arrangement shown in Fig. 1 the thermostatic switch is included in the circuit of a lamp 2 connected to the supply main 1. Upon operating a push-button contact 5, the heating winding 4 of the thermostat is connected in parallel with the thermostat contact, which in the example shown consists of the thermostatic stem 3 and the contact spring 6. Thus, the winding 4 will be short-circuited, when the stem 3 makes contact with the spring 6. Before the contact is closed, however, an amount of heat has been stored up in the winding sufficient to keep the contact 3, 6 closed during a certain period of time, the length of which depends upon the velocity by which the heat is conducted off and emitted, and which by the arrangement of the thermostatic switch in an evacuated receptacle will be considerably longer than in the case of said switch being arranged in air under otherwise equal conditions.

As appears from Fig. 1, the winding 4 is connected in series with the lamp. Owing to this arrangement it is possible to connect up the time switch in the same manner as an ordinary lamp switch without extending both branches of the main 1 onto the switch. If required, the time switch together with the push-button contact 5 may be connected in parallel with an ordinary turn type installation switch 8, as indicated by chain lines, so that the lamp may be cut in either by means of the ordinary switch 8 or by means of the time switch.

Fig. 3 shows by way of example how the push-button contact 5 and the thermostatic switch 7 may be combined with each other in the same casing 9 having the outer appearance of an ordinary push-button switch.

In the arrangement shown in Fig. 2 the lamp circuit is carried over a back contact 10 of the push-button switch so as to be closed only upon the push-button being released. Consequently, the heating winding 4 will not be cut off by the operation of the thermostat and a great amount of heat may therefore be stored up in the winding, whereby again the closing period may be prolonged. In order to prevent overheating of the thermostat by keeping the contact 5 pushed in for a long time, the circuit of the heating winding of the thermostat is carried over a contact formed by the thermostatic stem 3 and a contact spring 11, which contact will be opened only after the contact 3, 6 has been closed. In using such a breaking contact 3, 11 the heating winding may, if desired, be connected directly between the two branches of the main 1.

As shown by chain lines in Fig. 2 the push-button switch 5 may be combined with an ordinary turn type installation switch within the same casing 12 provided with a push-button 13 and turn handle 14, so that the lamp may be lighted for a long time or for a pre-determined short period, as desired.

I claim:

1. In time switching devices the combination with a lamp circuit of a thermostatic switch included in said circuit and consisting of a thermostat and a heating resistance both enclosed in an evacuated receptacle, a heating circuit for said resistance and a push-button switch in said circuit adapted, upon being operated, to close said heating circuit so as to cause the amount of heat required to be stored up momentarily in said heating resistance.

2. In time switching devices the combination with a lamp circuit of a thermostatic switch included in said circuit and consisting of a bimetallic stem and a heating winding both enclosed in an evacuated receptacle, a heating circuit for said winding and a push-button switch in said circuit adapted, upon being operated, to close said heating circuit so as to cause the amount of heat required to be stored up momentarily in said heating winding.

3. In time switching devices for lamp circuits the combination with a thermostatic switch consisting of a thermostat and a heating resistance both enclosed in an evacuated receptacle, of a heating circuit for said resistance, a push-button switch included in said circuit, and a short circuit for said heating resistance adapted to be closed by the closure of the thermostatic switch.

4. In time switching devices for lamp circuits the combination with a thermostatic switch consisting of a bimetallic stem and a heating winding both enclosed in an evacuated receptacle, of a push-button switch included in the lamp circuit in series with said winding.

5. In time switching devices for lamp circuits the combination with a thermostatic switch consisting of a bimetallic stem and a heating winding both enclosed in an evacuated receptacle, of a push-button switch included in the lamp circuit in series with said winding, and a short-circuit for said winding adapted to be closed by the closure of the thermostatic switch.

6. In time switching devices for lamp circuits the combination with a thermostatic switch consisting of a thermostat and a heating resistance both enclosed in an evacuated receptacle, of a heating circuit for said resistance, a push-button switch included in said circuit, and means under the control of the thermostatic switch for automatically disconnecting the heating resistance.

7. In time switching devices for lamp circuits the combination with a thermostatic switch consisting of a bimetallic stem and a heating winding both enclosed in an evacuated receptacle, of a push-button switch included in the lamp circuit and having a front contact connected to the heating winding and a back contact connected to the thermostatic switch.

In testimony whereof I affix my signature.

AXEL OSVALD APPELBERG.